Dec. 1, 1959  C. W. RAABE  2,915,155
CONTROL MECHANISM FOR CHILDREN'S AUTOMOBILES
Filed Sept. 11, 1956
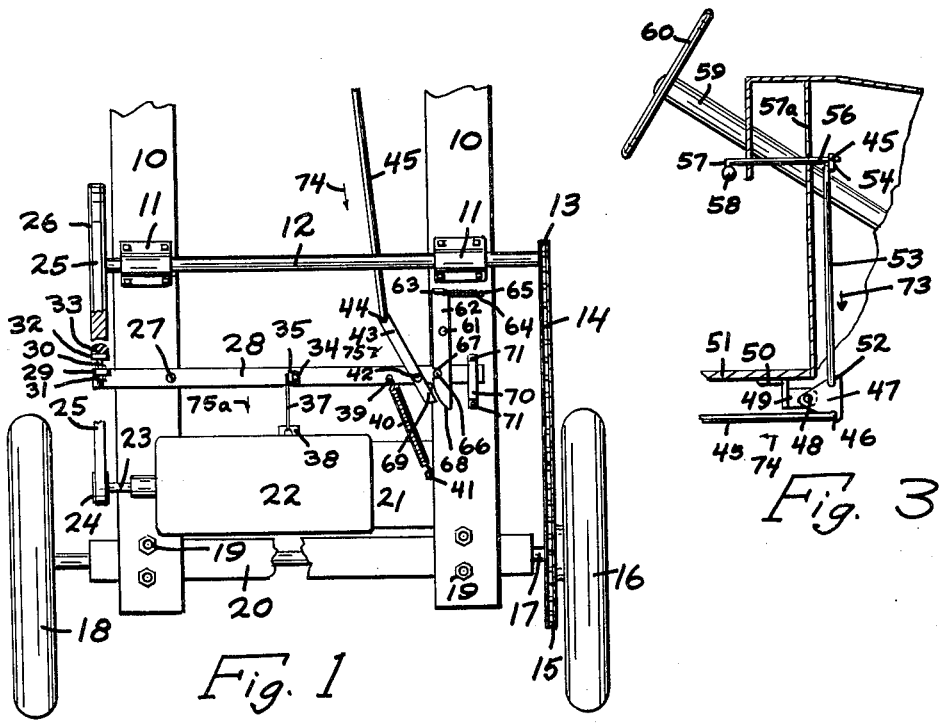
INVENTOR.
Carl W. Raabe
BY
*Sam J. Slotsky*
ATTORNEY

United States Patent Office 2,915,155
Patented Dec. 1, 1959

2,915,155

CONTROL MECHANISM FOR CHILDREN'S AUTOMOBILES

Carl W. Raabe, Largo, Fla.

Application September 11, 1956, Serial No. 609,286

3 Claims. (Cl. 192—3)

My invention relates to a control mechanism for a small child's automobile.

An object of my invention is to provide a very simple control mechanism which will function efficiently, and which can be manufactured at a reasonable cost.

A further object of my invention is to provide an automatic braking and releasing arrangement which works in cooperation with the throttling of the automobile engine.

With these and other objects in view, my invention consists in the construction, arrangement, and combination of the various parts of my device, whereby the objects contemplated are attained, as hereinafter more fully set forth, pointed out in my claims, and illustrated in the accompanying drawings, in which:

Figure 1 is a plan view of the rear portion of my device with the floor of the vehicle being removed, and with sections, Figure 2 is a side view of Figure 1, Figure 3 is a side view of a forward portion of the mechanism, and Figure 4 is a forward view of a portion of Figure 3.

My invention contemplates the provision of a simple automatic arrangement which can be used on small automobile vehicles of the type operated by children, and to provide instant braking features rendering the vehicle safe in operation, with attendant features for releasing the braking mechanism.

I have used the character 10 to designate a pair of parallel beams upon which my mechanism is mounted, the character 11 indicating bearings attached thereto in which bearings is journaled a transverse shaft 12 at one end of which is attached to smaller sprocket 13 which engages a sprocket chain 14, which in turn engages a larger sprocket 15 which is attached to a rear wheel 16, the rear wheel 16 thereby being the drive wheel, the wheel 16 being journaled on a further shaft 17 upon which is journaled the further rear wheel 18, the shaft 17 being suitably secured by means of U-bolts 19 to the channel 20 which is also secured as shown to the members 10.

The character 21 indicates a transverse brace upon which is attached the small internal combustion engine indicated generally by the character 22 which engine drives the shaft 23 which shaft is attached to the small pulley 24, and engaging the pulley 24 is the belt 25 which engages a larger pulley 26 which pulley 26 is attached to the other end of the shaft 12.

Pivoted at 27 to one of the members 10 is a flat bar 28 to which is attached the upwardly extending bracket 29 which receives the studs 30 which are suitably threaded to engage the nuts 31, and attached to the studs 30 is an arcuate brake unit 32 to which is attached the arcuate rubber shoe 33.

Attached to the strap 28 at 34 is a vertically positioned rod 35 which attached to 36 to a rod or cable 37 which passes to the intake or carburetor 38 of the engine 22.

Secured at 39 to the strap 28 is a helical spring 40 which is secured at 41 to the other member 10. Pivoted at 42 to the strap 28 is a lever 43 which is pivotally connected at 44 to a control rod 45 which passes forwardly and is pivotally attached at 46 (see Figure 3) to the bellcrank member 47 which is pivotally attached at 48 to an ear 49 which is secured at 50 beneath the floor board 51 of the vehicle.

Also pivotally attached at 52 to the member 47 is the vertical rod 53 which is pivotally attached at 54 to the arm 55 which is attached to, and extends outwardly from the horizontal shaft 56 which passes through the portion 57a of the vehicle, the shaft 56 terminating in the further control rod 57 terminating in the ball 58.

The character 59 indicates the steering post and the character 60 the steering wheel, the forward portions of the vehicle being made in any conventional manner not necessarily shown herein and including the forward wheels, etc.

Pivoted at 61 to a member 10 is a lever 62 to which is attached at 63 a helical spring 64 which is secured at 65 to the member 10 and attached to the bar 28 is a pin 66 which is received within the substantially circular indent 67 which is provided in the member 62.

The lever member 62 terminates in the curved portion 68, and the lever 43 terminates in a portion 69.

The end of the bar 28 is engaged within a keeper 70 which is attached at 71 to the member 10.

The operation of the device is as follows. As shown in Figures 1 and 2, the device is in its running position, or the brake is released, and the throttle is in its open position with the engine running at the necessary speed through the agency of the control rod 57.

However, as soon as the control rod 57 is pivoted downwardly in the direction of the arrow 72 (see Figure 1) and toward the position shown in Figure 3, the rod 53 will correspondingly be pushed downwardly in the direction of the arrow 73, and the control rod 45 will be pushed in the direction of the arrow 74, which causes the lever 43 to pivot in the direction of the arrow 75 until the portion 69 abuts against the curved portion 68, this continual progressive abutment forcing the opening 67 of the lever 62 out of engagement with the pin 66, until the spring 40 will be allowed to pull the bar 28 in the direction of the arrow 75a thereby also swinging the brake surface 33 into engagement with the pulley 26, thereby instantly stopping the vehicle, so that it therefore cannot coast after the gas supply is cut off or throttled down. The movement of the bar 28 in the direction of the arrow 75 will also operate the control member 37 to throttle down the engine at the same time, the various elements acting in unison.

When the control rod 57 is swung upwardly again, the reverse action will take place and the pin which will be resting on the curved surface 68 will be drawn into the opening 67 again as the rod 45 and lever 43 are pulled in the reverse direction.

The nuts 31 permit adjustment of the braking surface 33 during wearing action thereof.

It will thereby be noted that I have provided a complete safety feature which functions automatically and renders the vehicle safe for driving by youngsters and that I have provided an arrangement having the advantages set forth in the objects of my invention with further advantages being apparent.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. A control mechanism for small automobiles comprising a transversely positioned bar pivoted to the chassis of the automobile, an engine, a belt driven by said engine, a pulley, said belt engaging said pulley to drive said pulley, a braking member attached to said transverse bar and adapted to engage said pulley, spring means attached to said transverse bar for causing engagement of said braking member with said pulley, a pivoted spring urged lever member pivoted to said chassis having an opening, a pin attached to said bar received in said opening, a further lever pivoted to said transverse bar having a portion adapted to abut against an extension of said lever, a control rod pivotally attached to said further lever, movement of said control rod causing said portion to force said extension away from said pin to cause release of said pin and said transverse bar to provide braking engagement of said braking member with said pulley.

2. A control mechanism for small automobiles having an intake gas supply comprising a transversely positioned bar pivoted to the chassis of the automobile, an engine, a belt driven by said engine, a pulley, said belt engaging said pulley to drive said pulley, a braking member attached to said transverse bar and adapted to engage said pulley, spring means attached to said transverse bar for causing engagement of said braking member with said pulley, a pivoted spring urged lever member pivoted to said chassis having an opening, a pin attached to said bar received in said opening, a further lever pivoted to said transverse bar having a portion adapted to abut against an extension of said lever, a control rod pivotally attached to said further lever, movement of said control rod causing said portion to force said extension away from said pin to cause release of said pin and said transverse bar to provide braking engagement of said braking member with said pulley, said transverse bar including a vertical post attached thereto, a connecting member attached to said post and the intake gas supply of said engine, said braking member including an arcuate shoe for engaging a portion of said pulley.

3. A control mechanism for small automobiles having an intake gas supply comprising a transversely positioned bar pivoted to the chassis of the automobile, an engine, a belt driven by said engine, a pulley, said belt engaging said pulley to drive said pulley, a braking member attached to said transverse bar and adapted to engage said pulley, spring means attached to said transverse bar for causing engagement of said braking member with said pulley, a pivoted spring urged lever member pivoted to said chassis having an opening, a pin attached to said bar received in said opening, a further lever pivoted to said transverse bar having a portion adapted to abut against an extension of said lever, a control rod pivotally attached to said further lever, movement of said control rod causing said portion to force said extension away from said pin to cause release of said pin and said transverse bar to provide braking engagement of said braking member with said pulley, said transverse bar including a vertical post attached thereto, a connecting member attached to said post and the intake gas supply of said engine, said braking member including an arcuate shoe for engaging a portion of said pulley, a bell crank secured to said automobile to which said control rod is pivoted, a forwardly positioned control lever for operating said bell crank.

References Cited in the file of this patent

UNITED STATES PATENTS

| | | |
|---|---|---|
| 731,588 | Meinhard | June 23, 1903 |
| 2,117,016 | Brumbaugh | May 10, 1938 |